March 24, 1931. D. A. BRADING 1,797,400
PROCESS AND APPARATUS FOR PRODUCING ACETYLENE GAS
Filed March 26, 1925 4 Sheets-Sheet 4

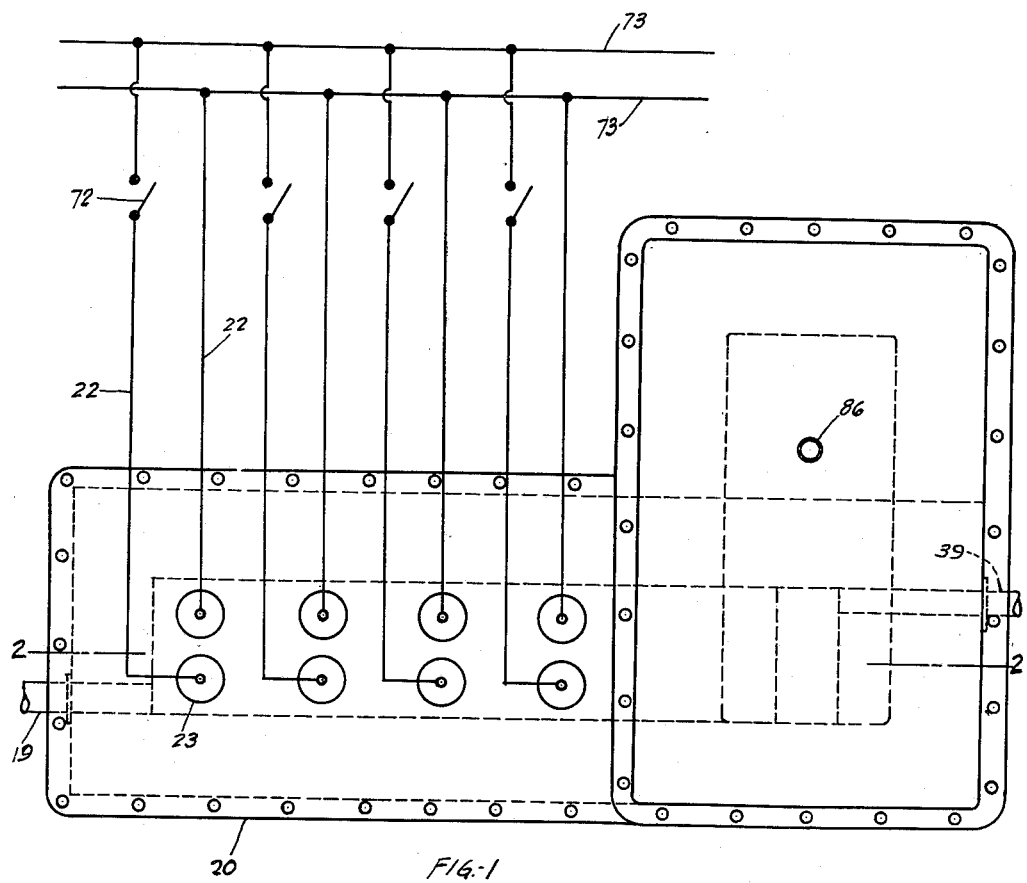

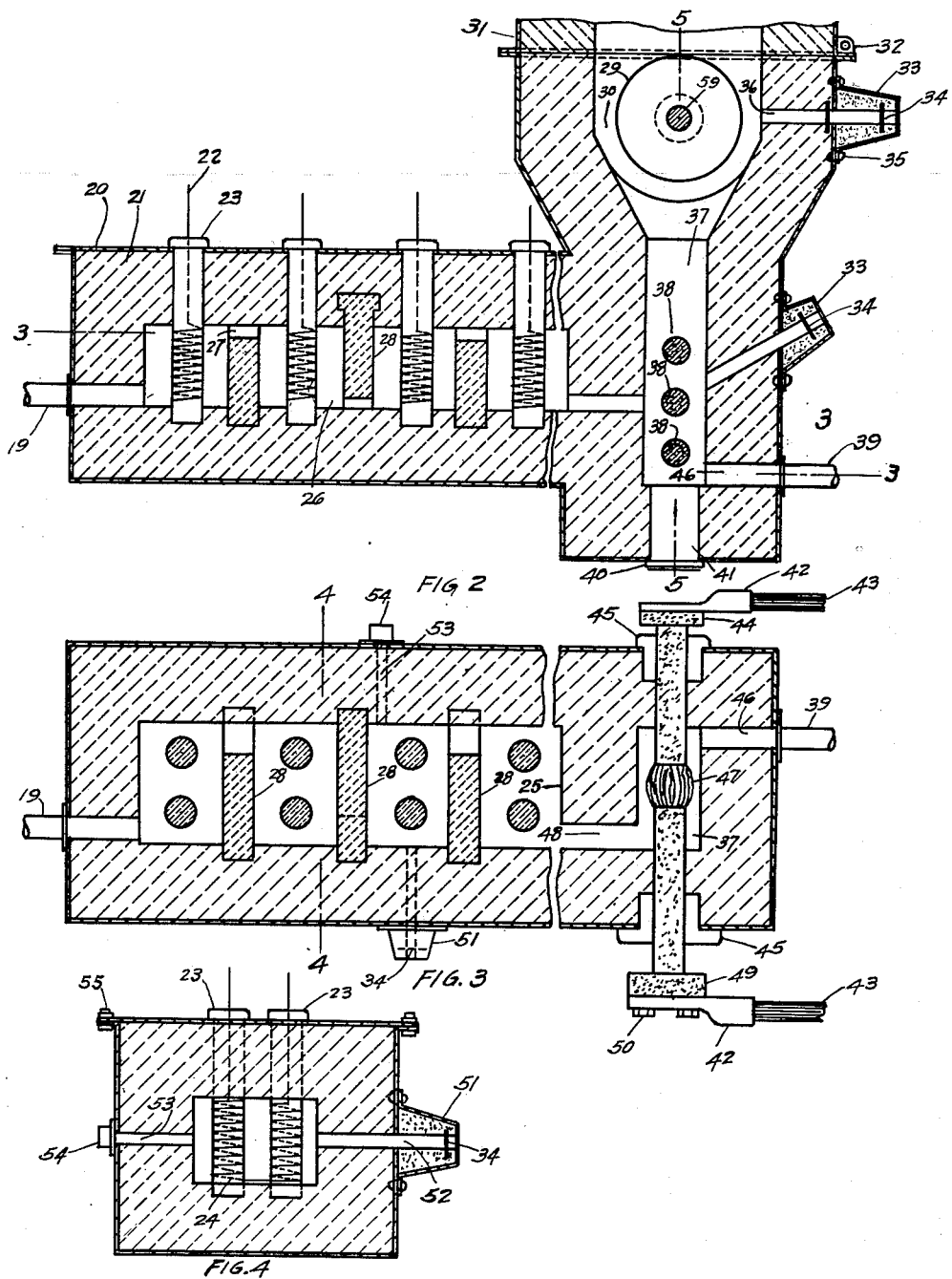

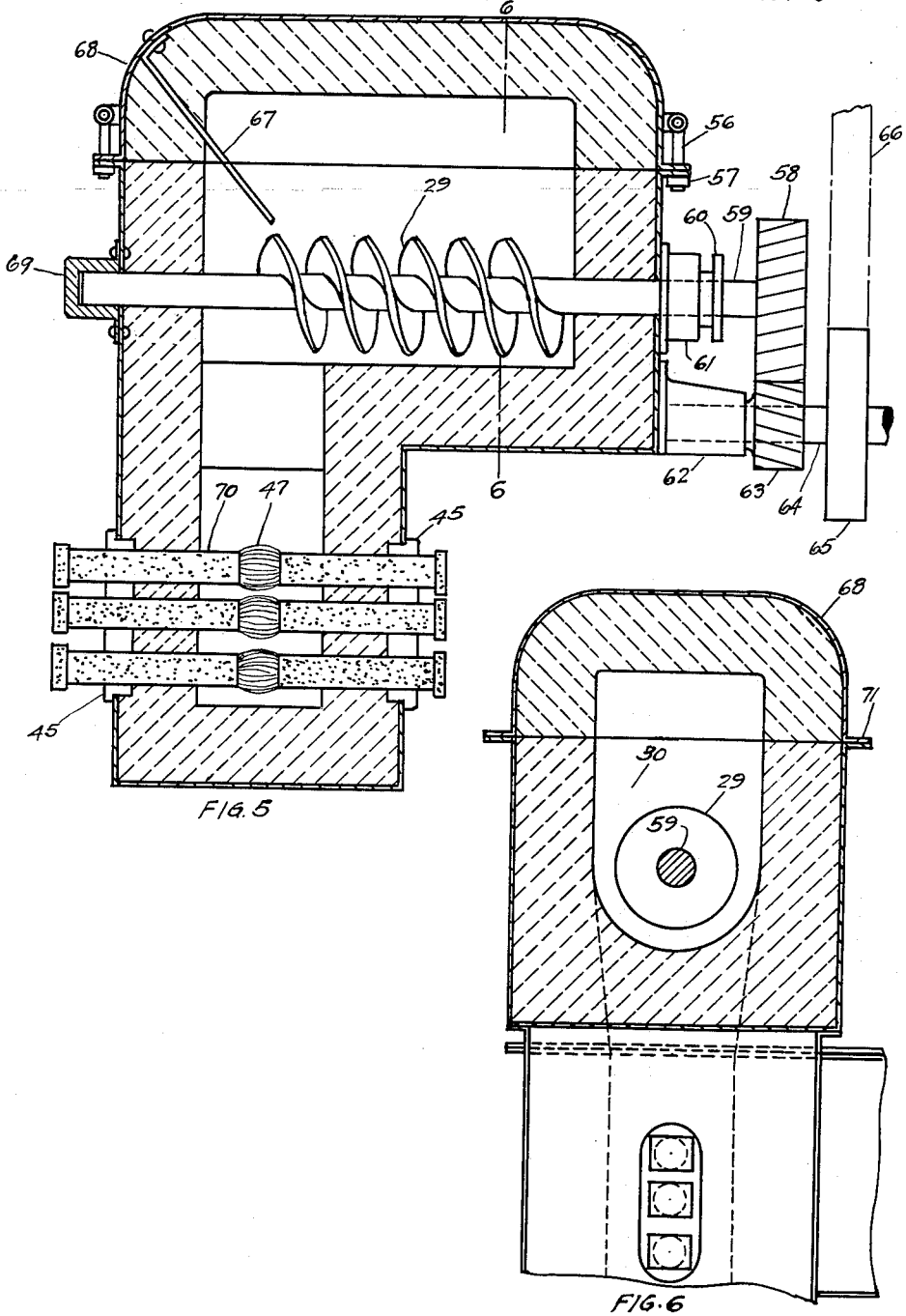

INVENTOR: Dennis A. Brading
By ATTY'S Parker & Carter

Patented Mar. 24, 1931

1,797,400

UNITED STATES PATENT OFFICE

DENNIS ARTHUR BRADING, OF CHICAGO, ILLINOIS, ASSIGNOR OF ONE-THIRD TO MAYME BRADING, OF CHICAGO, ILLINOIS

PROCESS AND APPARATUS FOR PRODUCING ACETYLENE GAS

Application filed March 26, 1925. Serial No. 18,593.

This invention relates to a new and improved process and apparatus for producing acetylene gas. Acetylene gas as now commercially produced is manufactured by using carbide. This method of producing acetylene gas is objectionable due to its expense and due to the use of lime. The present invention has as one of its objects to commercially produce acetylene gas at a much lower cost and which will be free from certain products due to the lime.

The invention has as a further object to commercially produce acetylene gas by bringing hydrogen and carbon together and subjecting them to a high temperature.

The invention has as a further object to utilize the hydrogen formed by the production of oxygen, in the manufacture of acetylene gas.
The invention has other objects which are more particularly pointed out in the accompanying description.

Referring now to the drawings:

Fig. 1 is a plan view of one form of apparatus for carrying out the process of producing acetylene gas.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 3.

Fig. 5 is a sectional view taken on line 5—5 of Fig. 2.
Fig. 6 is a sectional view taken on line 6—6 of Fig. 5.

Like numerals refer to like parts throughout the several figures.

Figure 7:
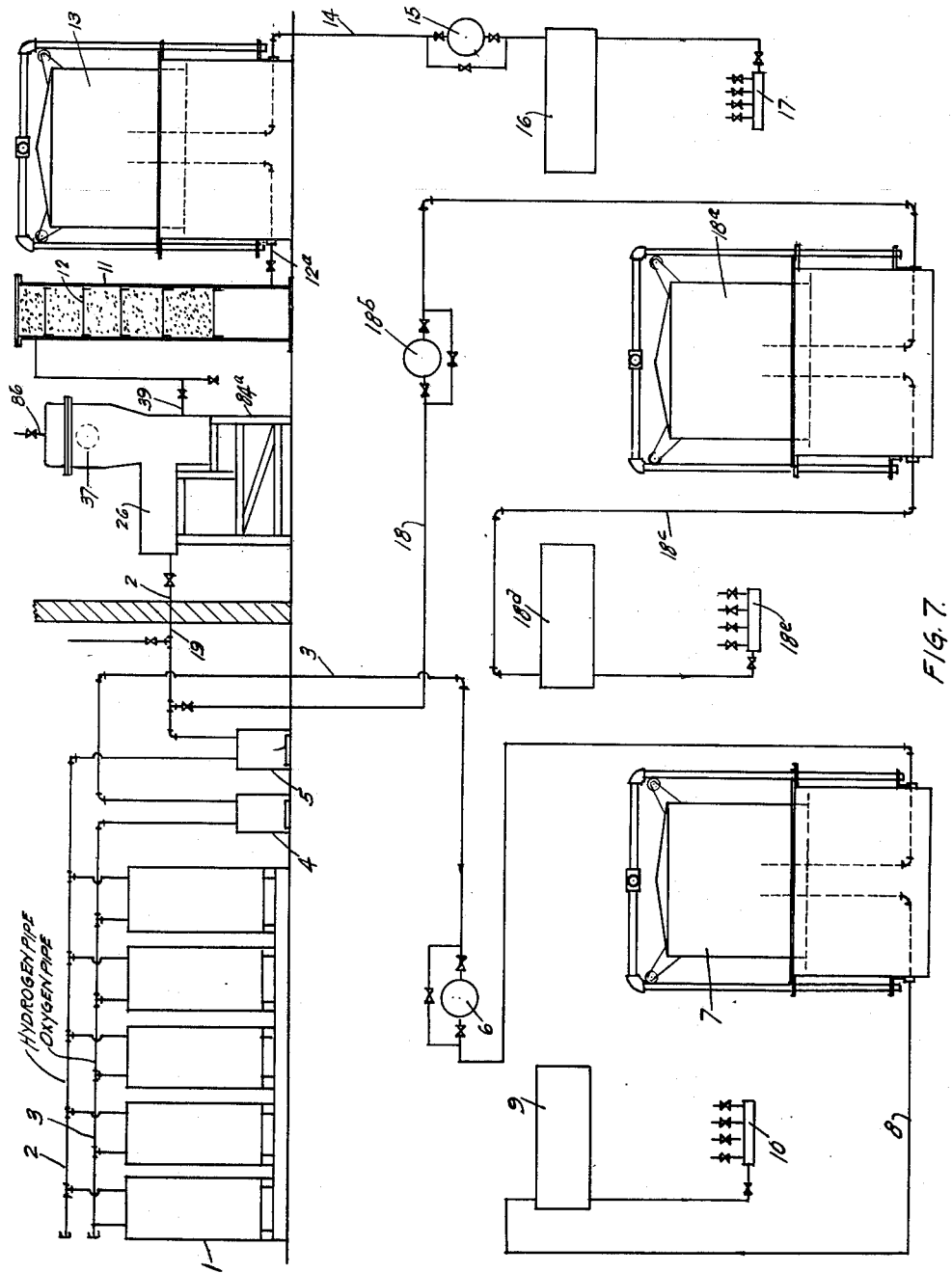
Fig. 7 is a diagrammatic view illustrating an apparatus for utilizing the hydrogen of an oxygen producing apparatus, to form acetylene gas.

In carrying out my process I take carbon in a finely divided state and pass it through a chamber containing an electric arc, and I simultaneously pass through this chamber hydrogen gas. The hydrogen gas is preferably preheated before it is introduced into this chamber containing the electric arc. In the construction shown the preheating is accomplished in a preheating device herein shown as consisting of a metal casing 20 with a highly refractory lining 21. A number of heating coils 24 are located in the hollow interior 26 of the preheating chamber and are preferably coiled around tubes or rods 23 to hold them in proper position and relation. These heating coils are connected by conductors 22 with the conductors 73 which connect with a suitable source of current supply. The heating coils as illustrated in Fig. 1 are arranged in pairs connected in series, and there is a switch 72 associated with each pair. It is, of course, evident that these coils may be arranged in any other desired manner. The hydrogen is introduced into the preheating chamber through the pipe 19. I prefer to provide a series of baffle plates 28 having passageways 27 through which the gas may pass.

Some means is preferably provided for observing what is going on in the preheating chamber. The construction for this purpose consists of an opening 52 with a piece 34 of mica extending thereacross. A casing 51 surrounds this opening and mica, the hole being arranged to prevent gas from escaping or air from entering. I also prefer to provide an opening 53 to permit the entrance of a thermocouple, this opening being closed by the part 54. A pyrometer may also be attached to the part 54. The top of the metal casing 20 is fastened to the remaining portion thereof by the bolts 55. The preheating chamber is connected with a heating chamber 37 containing the electrodes 38 of one or more electric arcs 47. These electrodes pass out through insulating members 45, and their ends 44 are connected to the terminals 42 of suitable conductors 43 which lead to the source of current supply.

The carbon is preferably formed into small particles, that is to say in a finely divided state, these particles being small enough to be easily volatilized by the electric arc. The carbon is placed in the carbon receptacle 30 (see Figs. 5 and 6), said receptacle being provided with a cover 31 hinged at 32 (see Fig. 2). This cover is arranged so that it may be closed to form an air tight connection with the receptacle. The cover is held down so as to be air tight by means of the bolts 56 and nuts 57. The cover is preferably provided with a metal casing 68 which has flanges 71. There are meeting flanges on the receptacle 37, the two flanges being engaged by the bolts and the nuts. The receptacle 30 is provided with a feeding device 29 which is illustrated in the form of a screw. The shaft 59 of this feeding device passes through a stuffing box 61 at one end and into an air tight bearing 69 at the other end. The entire construction is arranged so that the heating chamber 37 will be air tight so that the carbon and hydrogen will be brought together in this chamber free from oxygen. The shaft 59 and screw 29 are rotated in some suitable manner so as to feed the carbon from the chamber 30 into the heating chamber 37. In the drawing, this is accomplished by means of a driving shaft 64 which is driven from any suitable source of power, as for example, by means of the belts 66 engaging the pulley 65. The shaft 64 has a pinion 63 which engages a gear 58 on the shaft 59. A baffle plate 67 is provided to prevent the choking of the charging space. Some means is preferably provided for observing the feeding apparatus. In the construction shown this consists of a piece of mica 34 across the observing opening 36 so as to close the same. This mica is surrounded by a casing 33 attached by rivets 35 to the receptacle. There is a similar observing device for the chamber 37 so that the operator can see what is going on in this chamber.

When the carbon enters the chamber 37 the electric arc volatilizes the carbon and it is united with the hydrogen gas, and acetylene gas formed. This acetylene gas passes out through the passageway 46 and thence through the pipe 39 to the point desired. The bottom of the heating chamber 37 is provided with an opening 41 into which fits a hollow closing device 40 which receives any ashes or solid material which may result in the process. This material is removed by removing the part 40.

In Figure 7 I have shown diagrammatically a complete system of forming acetylene where the hydrogen gas formed in the production of oxygen may be used for this purpose. In this construction there is a series of electrolytic cells 1 of the usual type for converting water into oxygen and hydrogen. Connected with each of these cells is a hydrogen pipe 2 and an oxygen pipe 3. Connected with the oxygen pipe is an oxygen flash-back 4 and connected with the hydrogen pipe is a hydrogen flash-back 5. The oxygen pipe is provided with an oxygen meter 6 and leads to the gas holder 7. Leading from this gas holder is a pipe 8 which leads to an oxygen compressor 9. An oxygen charging stand 10 is connected with the compressor 9. The hydrogen pipe 2 is connected with the pipe 19 leading to the preheating chamber 26. The heating chamber 37 is provided with a vent pipe 86. The outlet 39 of the heating chamber 37 carries the acetylene gas to the purifier 11 which is provided with a series of shelves 12 containing the purifying material. A pipe 12 connects the purifier with the gas holder 13. A pipe 14 containing a gas meter 15 leads to the acetylene compressor 16, which compressor is connected with a charging stand 17.

Some means may be provided, if desired, for storing and using the hydrogen for other purposes. For this purpose I provide a pipe 18 connecting with the hydrogen pipe 2 and which leads to a hydrogen holder $18^a$, there being a gas meter $18^b$ connected with this pipe. A pipe $18^c$ leads from the gas holder $18^a$ to the hydrogen compressor $18^d$. This hydrogen compressor is connected with a hydrogen charging stand $18^e$.

I have described in detail a particular construction showing one form of the invention but it is, of course, evident that the parts may be varied in many particulars without departing from the spirit of the invention as embodied in the claims hereto appended and I therefore do not limit myself to the particular construction shown.

The use and operation of my invention are as follows:—

When the device is in use the hydrogen is conducted by the pipe 19 into the preheating chamber 26. The preheating coils 24 are connected in circuit so as to preheat the hydrogen. The hydrogen then passes into the heating chamber 37. The carbon is simultaneously passed into the chamber 37 by the operation of the screw 29. The electric arcs are now in operation and the carbon is volatilized by the heating and unites with the hydrogen forming acetylene gas. This gas passes out through the outlet 39 and may be conveyed to any desired point of use. I prefer to pass it through the purifier 11 and then into a storage tank or gas holder 13. It may then be compressed by the compressor 16 and loaded into the containers at the loading station 17.

It will be seen that I have here a commercial process and apparatus for producing acetylene gas in large quantities and at a low cost, the gas being of a high quality. It is of great importance to preheat the hydrogen before it enters the heating chamber 37 where it comes into contact with the carbon in the presence of the electric arc.

I claim:—

1. The process of producing acetylene gas which consists in preheating hydrogen and then bringing carbon in a finely divided solid state separate from said hydrogen and this preheated hydrogen into contact and subjecting them to a high temperature while thus in contact to form acetylene gas.

2. The process of producing acetylene gas which consists in preheating hydrogen and then bringing carbon in a finely divided solid state separate from said hydrogen and this preheated hydrogen into contact, and subjecting them to a high temperature in the absence of oxygen.

3. The process of producing acetylene gas which consists in volatilizing carbon and simultaneously bringing preheated hydrogen heated from a different source of heat, into contact therewith, the carbon and hydrogen being brought together from different sources of supply.

4. The process of producing acetylene gas which consists in separately feeding carbon in a finely divided solid state and preheated hydrogen to bring them into contact in the presence of an electric arc.

5. The process of producing acetylene gas which consists in bringing hydrogen into contact with an electric arc and simultaneously passing carbon by gravity in a finely divided solid state past said arc.

6. An apparatus for producing acetylene gas comprising a preheating chamber, a heating chamber, an electric arc producing device in said heating chamber, means for simultaneously delivering from separate sources of supply hydrogen and carbon in a finely divided solid state into said heating chamber in proximity to said electric arc so as to combine the carbon and the hydrogen gas to form acetylene gas.

7. An apparatus for producing acetylene gas comprising a preheating chamber through which hydrogen is passed, an electric heating device in said chamber, means for connecting said electric heating device in an electric circuit, a heating chamber, an electric arc producing device in said heating chamber, a connection between said preheating chamber and said heating chamber through which preheated hydrogen is delivered to the heating chamber, and means for passing carbon in a finely divided solid state through the heating chamber to combine them to form acetylene gas.

8. An apparatus for producing acetylene gas comprising a preheating chamber for preheating hydrogen, a plurality of heating devices in said preheating chamber, a baffle plate between said heating devices, a heating chamber, a connection between said preheating chamber and said heating chamber through which preheated hydrogen is delivered to the heating chamber, and means for simultaneously delivering carbon in a finely divided solid state to said heating chamber to combine them to form acetylene gas.

9. The process of producing acetylene gas which consists in passing solid carbon in a finely divided state in an angular direction past an electric arc, the arc and the solid carbon at the time it passes the arc being immersed in an atmosphere of hydrogen, the carbon and the hydrogen being introduced separately.

In testimony whereof I have signed this specification.

DENNIS ARTHUR BRADING.